Oct. 6, 1970 C. E. WILLIAMSON ET AL 3,532,299

DEPLOYABLE SOLAR ARRAY

Filed Feb. 5, 1968 2 Sheets-Sheet 1

INVENTORS
CLYDE E. WILLIAMSON
DONALD R. BAKER
BY Donald R. Nyhagen
ATTORNEY

Oct. 6, 1970 C. E. WILLIAMSON ET AL 3,532,299

DEPLOYABLE SOLAR ARRAY

Filed Feb. 5, 1968

2 Sheets-Sheet 2

INVENTORS
CLYDE E. WILLIAMSON
DONALD R. BAKER

BY Donald R. Nyhagen

ATTORNEY

United States Patent Office 3,532,299
Patented Oct. 6, 1970

3,532,299
DEPLOYABLE SOLAR ARRAY

Clyde E. Williamson, Los Angeles, and Donald R. Baker, Lawndale, Calif., assignors to TRW Inc., Redondo Beach, Calif., a corporation of Ohio Filed Feb. 5, 1968, Ser. No. 703,157
Int. Cl. B64g *1/30*
U.S. Cl. 244—1 19 Claims

ABSTRACT OF THE DISCLOSURE

A deployable solar cell array for spacecraft having a foldable solar panel assembly composed of a number of thin film solar panels hinged edge-to-edge which are folded in accordion fashion into face-to-face relation flat against the spacecraft body during launch, and extendable booms connected to the panel assembly for deploying the latter to an extended position of operation wherein the solar panels are disposed in generally coplanar edge-to-edge relation to provide a light-weight large area solar array. A spacecraft embodying a pair of the deployable solar arrays for supplying electrical power to onboard electrical equipment, such as thrust and attitude control ion engines.

BACKGROUND OF THE INVENTION

Field of the invention

This invention relates generally to spacecraft and more particularly to a novel deployable thin film solar cell array for spacecraft. The invention relates also to a spacecraft embodying a pair of the deployable solar cell arrays for supplying electrical power to electrical equipment onboard the spacecraft.

Prior art

Spacecraft are commonly provided with one or more solar cell arrays for supplying electrical power to electrical equipment onboard the spacecraft. Such an array consists of a number of individual solar cells mounted on a suitable support and electrically connected in such a way as to provide the desired electrical output. The electrical power generated by such a solar array, of course, is related to the number of solar cells in the array. Solar arrays may be generally classified as fixed arrays and deployable arrays. A fixed array is one in which the solar cells are mounted on fixed panels, or the like, rigidly secured to the spacecraft body. Exemplary of such a fixed array, for example, is that employed on the COMSAT satellite, wherein the solar panels are mounted circumferentially about the satellite body. A deployable array, as its name implies, is one which is retained in a retracted or collapsed position of stowage during launch and is then deployed to an extended position of operation when in orbit. The primary advantage of the deloyable array over the fixed array is the larger effective area, and hence a greater number of solar cells and greater electrical output, of the deployable array.

Deployable solar arrays, while superior from the standpoint of electrical output, present certain problems which the present invention seeks to overcome. Among the foremost of these problems is stowage of the array during launch and extension of the array when in orbit without excessive weight penalty, cost factors, and operational reliability. A variety of deployable solar arrays have been devised which seek to solve, in different ways, the above and other problems which attend such arrays. Some existing solar arrays of this type, for example, embody a drum on which the array is stowed during launch and from which the array is deployed when in orbit by driving the drum in a direction to unwind the array from the drum. Another existing depolyable solar array utilizes a frame, tennis racket-like substrate on which the solar cells are mounted. This array is folded for launch and deployed by unfolding the substrate. These and other existing deployable arrays, however, are characterized by various deficiencies, notably excessive complexity and weight.

SUMMARY OF THE INVENTION

The present invention provides an improved deployable solar cell array having a foldable solar panel assembly composed of a number of generally planar and rectangular solar panels hinged edge-to-edge. According to a preferred and highly beneficial feature of the invention these solar panels each comprise a number of so-called thin-film solar, cells joined edge-to-edge by strips of adhesive tape or other suitable means to provide a solar panel assembly characterized by large effective area, light-weight, flexibiilty, and minimum stowage volume. One end panel of the assembly is hinged to the spacecraft body in such a way that the assembly may be folded in accordion fashion to a retracted position of stowage flat against one side of the body. In this stowed position, the solar panels of the assembly are disposed in face-to-face relation so as to provide a relative flat folded array of minimum stowage volume.

The present solar array also embodies deployment for deploying the folded solar panel assembly to an extended position of operation. In this extended position, the solar panels are disposed in generally coplanar edge-to-edge relation so as to provide a generally wing-like solar array of relatively large effective area capable of generating substrate electrical power. According to one application of the invention, for example, the spacecraft is equipped with a pair of the present deployable solar arrays and with thrust and attitude control ion engines which are powered by the electrical output of the solar arrays. Various deployment means may be utilized in the present solar array. The particular deployment means described in this disclosure comprises an extendable boom mechanism having a pair of spaced parallel booms which straddle the solar panel assembly in the endwise directions of hinge axes and are mounted on the spacecraft for longitudinal extension and retraction normal to these axes.

The outer ends of the booms are joined by a tie-bar which is hinged to the outer end panel of the panel assembly. The ends of the remaining panels are attached to the booms by slide pivot connections.

During launch, the panel assembly is folded to its stowed position flat against the adjacent side of the spacecraft body, and the deployment booms are longitudinally retracted to positions wherein the tie-bar presses against the outer end panel to retain the panel assembly in its folded position. After orbit is achieved, the booms are extended to deploy the panel assembly to its extended position of operation. The slide pivot connections of the solar panels support the latter on the booms and thereby unfold as the booms extend. In the disclosed embodiment of the invention, the folded solar cell arrays and the spacecraft body mounting the arrays are enclosed in a shroud during launch. After orbit is achieved, this shroud is ejected to permit deployment of the arrays.

DESCRIPTION OF THE PREFERRED EMBODIMENTS

Figures 1, 1A, 2:
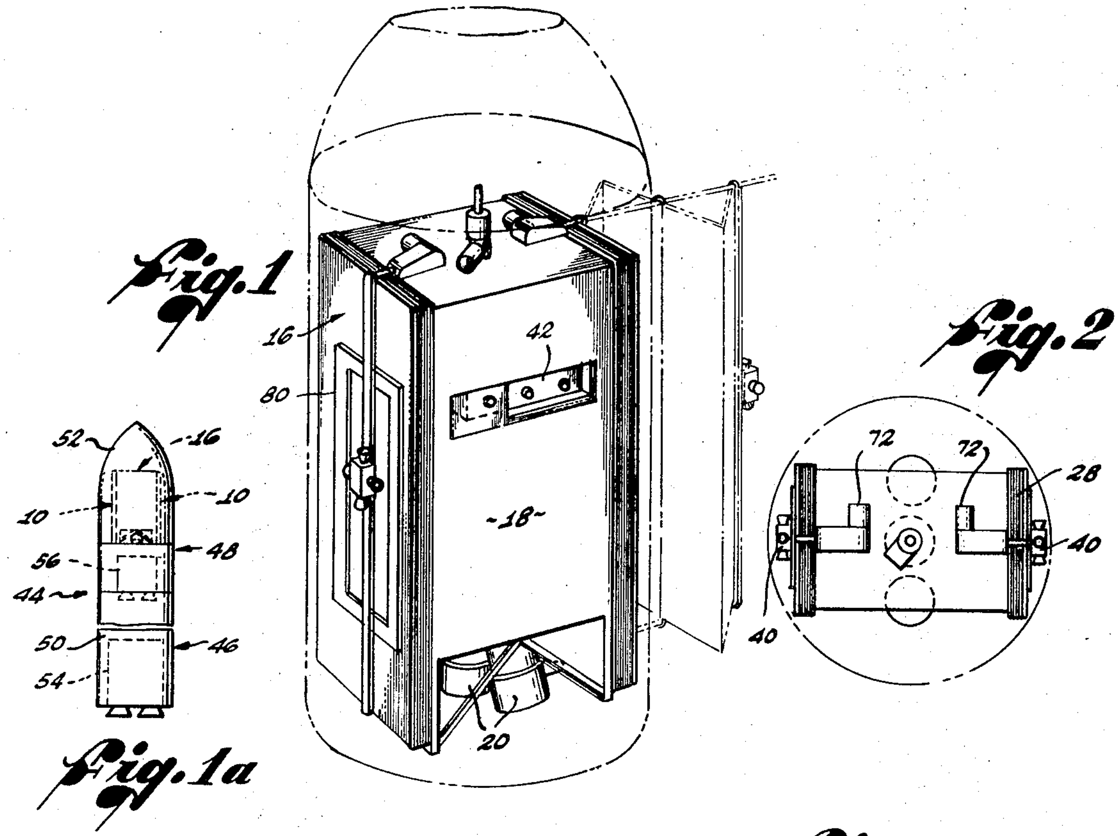
FIG. 1 is a perspective view of a spacecraft embodying a pair of the present deployable solar arrays.
FIG. 1*a* is a side elevation in reduced scale of a launch vehicle for launching the spacecraft into orbit.
FIG. 2 is a top plan view of the spacecraft.

The present invention provides a deployable solar cell array, represented in FIGS. 1 through 6 by the array 10, having a foldable solar panel assembly 12 and deployment means 14 for the assembly. The illustrated solar array is mounted on a spacecraft 16. Since the precise construction of the spacecraft forms no part of the invention, it is unnecessary to describe the same in detail. Suffice it to say that the spacecraft has a housing 18 which forms part of the craft body. This housing is generally rectangular or cylindrical in shape and contains various equipment including, in this instance, a number of ion thrust engines 20 to be powered by the electrical output from the solar cell array 10.

Referring now to the array 10 in general terms, its solar panel assembly 12 is composed of a number of generally planar and rectangular solar panels 22 disposed edge-to-edge, and hinge means 24 pivotally joining the adjacent panels along their longitudinal edges 26. Solar array 10 is located at one side 28 of the spacecraft housing 18 and has an inner end panel adjacent the housing and an opposite outer end panel remote from the housing. These inner and outer end panels have free longitudinal edges 30 and 32, respectively. The free edge 30 of the inner panel is pivotally joined, by an inner hinge means 34, to the housing side 18. The several hinge axes parallel the longitudinal axis 36 of the housing 18. It will become evident as the description proceeds, however, that the present solar array 10 may be oriented in some other attitude relative to the housing.

During launch, the solar panel assembly 12 is folded in accordion fashion to a retracted position of stowage, shown in FIGS. 1 and 2. In this retracted position, the folded assembly is positioned flat against the side 28 of the spacecraft housing 18 with the solar panels 22 disposed in face-to-face relation. This provides the folded assembly with minimum stowage volume. At some time after launch, such as when the spacecraft has achieved final orbit, the solar panel assembly 12 is unfolded or deployed to an extended position of operation illustrated in FIGS. 3 and 4. In this extended position, the solar assembly projects in wing-like fashion laterally from the spacecraft housing 18 with the solar panels 22 disposed in generally coplanar edge-to-edge relation so as to provide a solar cell array of relatively large effective area.

The solar panel deployment means 14 is mounted on the spacecraft housing 18 and is connected to the solar panel assembly 12 for deploying the latter from its retracted position of stowage to its extended position of operation. As noted earlier, a variety of deployment means may be utilized to thus deploy the panel assembly. The particular deployment means illustrated comprise a longitudinally extendable boom mechanism mounted on the housing 18 for longitudinal extension along a direction line normal to the hinge axes of the solar panel assembly 12. During launch, the boom mechanism 14 is retracted to its position of FIGS. 1 and 2 to retain the panel assembly in its stowed position. During deployment, the boom mechanism is extended to its position of FIGS. 3 and 4. In the course of this extension, the boom mechanism pulls the solar panel assembly longitudinally outward from the spacecraft housing 18 and thereby unfolds and deploys the assembly.

The particular spacecraft 16 illustrated is equipped with a pair of the deployable solar arrays 10. These arrays are mounted at opposite sides of the spacecraft housing 18 and are deployed in unison to their extended operating positions of FIGS. 3 and 4. Mounted on the outer ends of the two solar arrays are attitude control ion engines 40. These engines, and the ion thrust engines 20, are electrically eonnected, through suitable control equipment 42 within the housing 18, to the solar panels 22 in such a way that the engines are powered by the electrical output from the panels. It will be observed that when the two solar arrays 10 are deployed or extended, their solar panel assemblies 12 are disposed in planes parallel to the longitudinal axis 36 of the space craft housing 18. In the particular embodiment of the invention under consideration, the two panel assemblies, when deployed, are located in a common plane containing the housing axis. This coplanar relationship of the deployed arrays, however, is not essential, as will become evident from the later description.

Insofar as the present invention is concerned, the method of launching the spacecraft 16 into orbit, and the overall configuration of the launch vehicle used for this purpose are of no consequence. For this reason, it is unnecessary to describe the launching technique and vehicle in detail. However, one possible launch vehicle configuration has been illustrated in FIG. 1*a* merely to provide a beter understanding of the invention and its advantages. The illustrated launch vehicle 44 will be seen to comprise a main booster stage 46 and a secondary booster stage 48. These stages have cylindrical shrouds 50, 52 and booster engines 54, 56, respectively. The spacecraft 16 is mounted within the secondary stage shroud 52. In this regard, it is significant to note that an important advantage of the invention resides in the fact that the present solar arrays 10, when in their retracted positions of stowage, are so compactly folded as to permit the spacecraft housing 18 and the folded arrays to be completely contained within and enclosed by the secondary stage shroud 52. With this particular launch vehicle configuration, the spacecraft 16 is placed into orbit by first igniting the main booster engines 54 to propel the launch vehicle to the altitude at which second stage separation and ignition is to occur. At this altitude, the booster stages 46, 48 are disconnected and the secondary stage engines 56 are ignited to accelerate the secondary stage to the desired orbital velocity and trajectory of the spacecraft. The shroud 52 of the secondary is then ejected to uncover the spacecraft and the latter is separated from the secondary stage. After the spacecraft has thus been injected into orbit, the solar arrays 10 are deployed to their extended positions of operation and the spacecraft engines 20, 40 are activated to maneuver the spacecraft into the proper orbital attitude in which the deployed solar arrays face the sun.

Figure 3:
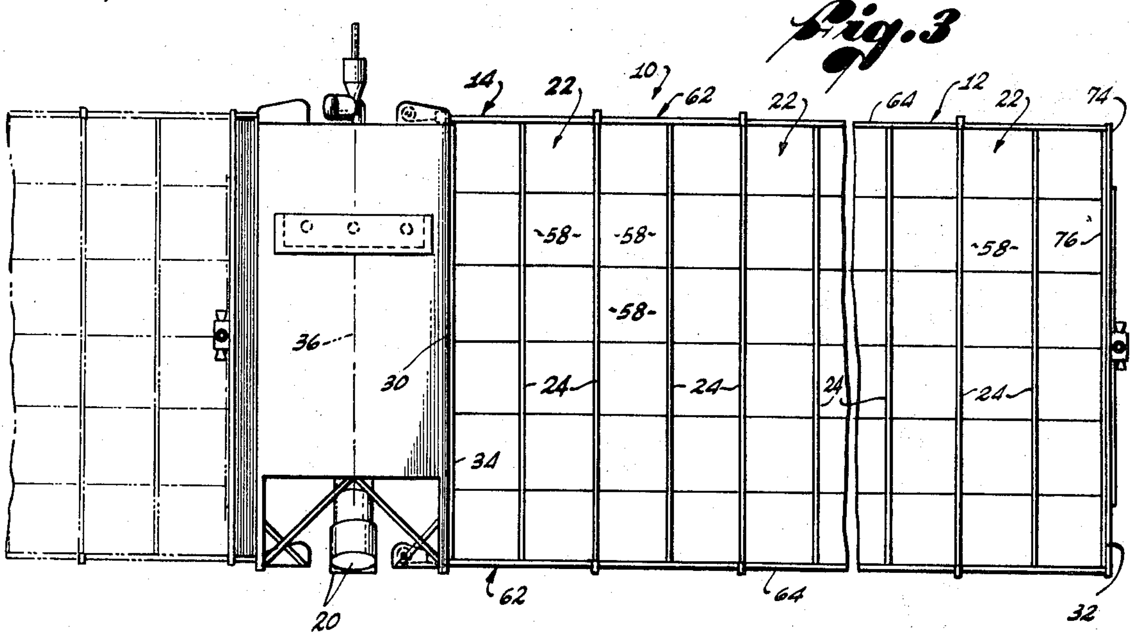
FIG. 3 is a side elevation of the spacecraft showing one of the solar arrays in a retracted position of stowage which it occupies during launch and the other solar array deployed to its extended position of operation.
Figure 4:
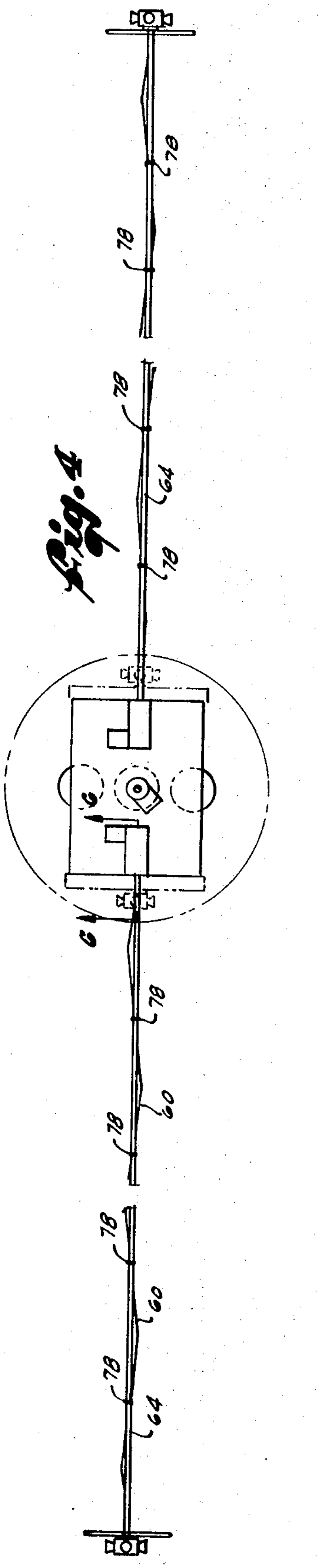
FIG. 4 is a top plan view of the spacecraft with both solar arrays deployed to their extended positions of operation.

Referring now in greater detail to the drawings, each solar panel 22 of the solar panel assembly 12 comprises a number of individual solar cells 58 arranged edge-to-edge in a rectangular pattern so as to provide the panel with an overall rectangular shape. According to the preferred practice of the invention, so-called thin-film solar cells are employed in the panel assembly. Since these cells are commercially available and their details of construction are not directly pertinent to the invention, they need not be described in detail. Suffice it to say that typical cells of this type have a thin, flexible substrate 60 which is generally square in shape and measures on the order of 3″ x 3″. According to the present invention, the solar cells on each solar panel 22 are joined edge-to-edge by strips 61 of tape or other suitable means. The solar panel hinges 24, 30 may comprise piano hinges, Mylar flexural hinges, or the like. Turning now to FIG. 3, it will be observed that the deployment boom mechanism 14 of each solar array 10 embodies a pair of separate boom devices 62 having longitudinally extendable booms 64 which straddle the corresponing solar panels assembly 12 in the endwise direction of its hinged solar panels 22. The outer ends of the booms are hinged to the outer panel 22 of the panel assembly and the remaining panels are slidably and rotatably supported on the booms, all in a manner to be explained presently, whereby extension of the booms in unison deploys the panel assembly to its extended position of operation shown in FIG. 3. Obviously, a variety of extendable boom devices may be employed for this purpose, such as telescoping booms, for example. The particular boom devices illustrated, however, are preferred because of their relatively low-weight and simplicity of construction.

The illustrated boom devices 62 are commercially available. Accordingly, it is necessary to describe these devices only in such detail as to provide a complete understanding of the present invention. With this in mind, it is sufficient to say that the boom 64 of each device is a strip of spring metal, typically a stainless steel strip, which is stressed to normally curl laterally into a generally cylindrical tube-like configuration having its central axis parallel to the longitudinal axis of the strip. The inner end of the boom strip is secured to a drum 66 which is rotatably supported within a housing 68 mounted on the spacecraft housing 18. The outer end of the boom extends from the housing through a cylindrical exit guide 70. In the normally retracted condition of each boom 64, its strip is wound in a flat condition on the drum 66 to position wherein the outer end of the boom is located adjacent the corresponding side 28 of the spacecraft housing 18. The boom is extended by driving the drum 66 in a direction to unwind the strip from the drum. As the boom strip is thus unwound from the drum, it curls laterally into its cylindrical tube-like configuration and emerges longitudinally through the boom housing exit guide 70 in the form of a tubular boom. Drum 66 is driven by a motor 72 which is reversible to permit both extension and retraction of the boom strip. In the ensuing description, the boom strip will be referred to simply as a boom.

In the particular embodiment of the invention under consideration, the length of the solar panels 22 in the direction of their hinge axes approximates the overall length of the spacecraft housing 18. The two boom devices 62 of each solar array 10 are mounted on opposite ends of the housing in such a way that the longitudinal axes of their exit guides 70 are located in the common plane of the inner solar panel hinges 34 and extend normal to the adjacent side face 28 of the housing. Thus, the booms 64 are extendable along parallel direction lines in the planes. Extending between and secured to the outer ends of the two booms of each solar array 10 is a tie-bar 74 which mounts the corresponding spacecraft attitude control engine 40. An outer hinge 76 pivotally joins this tie-bar to the free edge 32 of the outer end panel 22 of the panel assembly 12. The axis of the outer hinge parallels the other hinge axes of the panel assembly. The assembly panels 22 are joined to the booms 64 by slide pivot connection 78. These connections are slidable along the booms and are secured to the panels in such a way as to permit pivoting of the panels relative to the booms about axes parallel to the panel assembly hinge axes. In the particular embodiment of the invention under discussion, the slide pivot connections 78 are aligned with alternate hinges 24 of the panel assembly 12. Various types of slide pivot connections may be employed in the present solar array. The particular connections illustrated comprise rings.

Prior to launch of the spacecraft 16, the deployment booms 64 of the two solar arrays 10 are retracted to the stowed position of FIGS. 1 and 2 to fold the solar panel assemblies 12 to their stowed positions. In this regard, it will be observed that the panel assemblies are folded in such a way that the two innermost solar panels 22 fold to one side of the common plane of the booms, the next two panels fold to the opposite side of this plane, the following two panels fold to the first side of the plane, and so on in alternate fashion. In the fully retracted or stowed positions of the solar arrays, the outer ends of the booms 64 are located adjacent the sides 28 of the spacecraft housing 18, and the solar panel assemblies 12 are folded flat against the housing sides with their solar panels 22 disposed in face-to-face relation at opposite sides of the boom plane. Means 80 are preferably provided for retaining the panel assemblies in these folded positions. Such panel retaining means may comprise light-weight strong backs or frames secured to the outer boom tie-bars 74 so as to press against the outer panels 22 of the folded panel assemblies when the booms are retracted. It should be noted here that a significant advantage of the illustrated solar arrays resides in the fact that the solar panels 22, being composed of thin-film solar cells, are relatively flexible and thus may conform to any reasonable curvature of the spacecraft housing sides 28. Accordingly, while the illustrated spacecraft housing is shown to have flat sides, these sides could be curved. In the event that the housing sides are thus curved, the strong-back frames 80 will be correspondingly curved so as to retain the folded solar panel assemblies 12 flat against the curved sides. As noted above, panel retaining means other than the illustrated strong-back frames may be employed for retaining thhe solar panel assemblies 12 in their folded positions. For example, the folded panel assemblies may be releasably pinned to the spacecraft housing. Alternatively, the outer end panels of the assemblies may be made relatively stiff so as to serve as strong-backs. A wide variety of other panel retaining means may be employed, of course.

After the solar arrays 10 have been properly stowed, the spacecraft 16 is mated with its launch vehicle 44. In this regard, it will be recalled that when the spacecraft is assembled in the launch vehicle, the craft, and its folded solar arrays, is enclosed by the secondary stage shroud 52 of the vehicle. After launching of the spacecraft into orbit, in the manner explained earlier, the solar arrays 10 are deployed to their extended positions of operation illustrated in FIGS. 3 and 4 by extension of the solar panel deployment booms 64. It will be understood, of course, that during this extension of the booms, the solar panel assemblies 12 are pulled outwardly by virtue of the outer hinge connections 76 between the outer end panels 22 of the assemblies and the boom tie-bars 74. As the panel assemblies are thus deployed, their solar panels progressively unfold until, in their fully deployed positions, the panels are disposed in generally edge-to-edge relation substantially in the common plane of the extended deployment booms 64. The slide pivot connections 78 permit the solar panels 22 to pivot and slide relative to the booms during their deployment, thus to enable unfolding of the solar panel assemblies.

As noted earlier, the electrical output generated by the solar arrays 10 may be utilized to power various electrical equipment on board the spacecraft 16. In the illustrated spacecraft, the electrical output of the solar arrays is used to energize the thrust and atttiude control ion engines 20, 40. With the particular mounting of the solar arrays illustrated in FIGS. 1 through 6, the atttiude control engines 40 may be mounted directly on the deployment boom tie-bars 72, as shown, since the deployed solar arrays 10 are located in a common plane containing the longitudinal axis 36 of the spacecraft housing 18.

Figure 7:
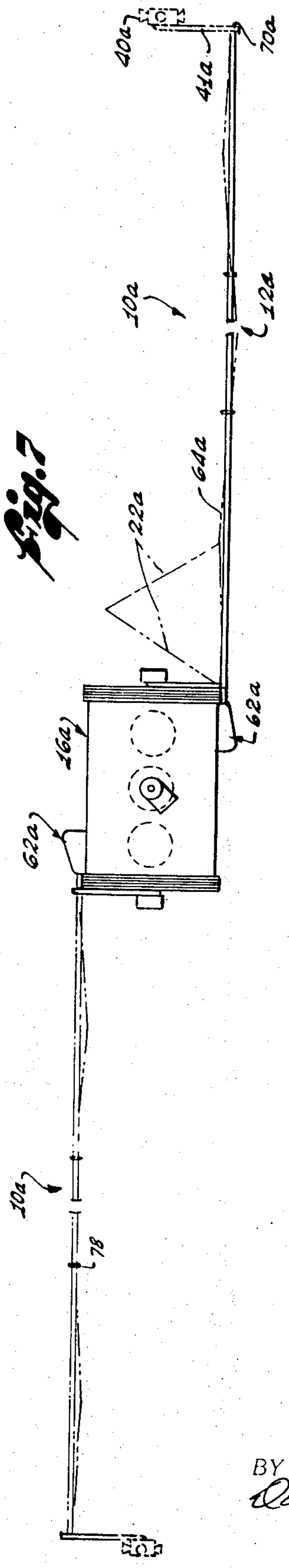
FIG. 7 is a top plan view of a spacecraft embodying slightly modified solar arrays according to the invention.
Figure 6:
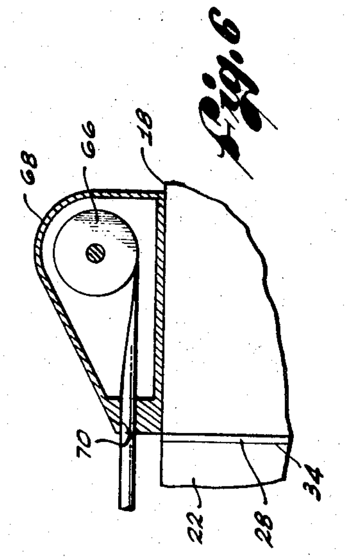
FIG. 6 is an enlarged section taken on line 6—6 in FIG. 4.
Figure 5:
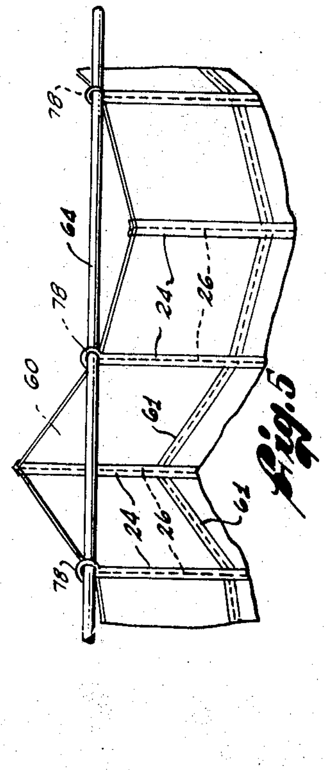
FIG. 5 is a fragmentary detail in perspective of one of the solar arrays.

Reference is now made to FIG. 7 which illustrate slightly modified solar arrays 10*a* according to the invention mounted on a spacecraft 16*a*. The modified solar arrays are identical to the solar arrays 10 except that the modified arrays are mounted on the spacecraft housing 18*a* at opposite sides of a common longitudinal medial plane of the spacecraft containing its longitudinal axis. The array deployment boom devices 62*a* mounted on opposide sides of the housing in such a way that their booms 64a extend along direction lines parallel to and located at opposite sides of the medial plane. Moreover, the solar panel assembly 12a of each solar array 10a is folded to its stowed position in a way that all of its solar panels 22a fold into face-to-face relation at the same side of the respective deployment booms 64a, as shown in FIG. 5. The modified solar arrays 10a are otherwise identical to and are deployed in precisely the same way as the first described solar arrays 10 of the invention. Accordingly, no further description of the modified solar arrays is deemed necessary.

The embodiment of the invention illustrated in FIG. 7 also utilizes a slightly modified mounting arrangement for the attitude control engines 40a of the spacecraft 12a. In this regard, it will be observed that these engines are mounted on brackets 41a which are attached to the outer boom tie-bars 74a. These brackets extend laterally toward the medial plane of the spacecraft 16a to locate the attitude control engines in this plane.

While the invention has been disclosed in connection with certain illustrative embodiment thereof, it will be immediately recognized by those versed in the art that various modifications of the invention are possible.

What is claimed as new in support of Letters Patent is:

1. A deployable solar array comprising:

a housing;

a foldable solar panel assembly at one side of said housing including a number of generally planar and rectangular solar panels disposed edge-to-edge, and hinge means pivotally joining adjacent panels along the adjacent edges thereof;

said panel assembly having an inner end panel adjacent said housing and an outer end panel remote from said housing, and said end panels having free edges parallel to said adjacent panel edges;

inner hinge means pivotally joining said inner panel to said housing side along said free edge of said inner panel;

said hinge means having parallel hinge axes whereby said panel assembly may be folded to a retracted position of stowage wherein the assembly is positioned flat against said housing side with the adjacent panels disposed in face-to-face relation, and said panel assembly may be unfolded to an extended position of operation wherein said assembly projects laterally from said housing side with said panels disposed in edge-ot-edge relation substantially in a common plane; and deployment means mounted on said housing and connected to said panel assembly for deploying said assembly from said retracted position to said extended position including longitudinally extendable boom means mounted on said housing for longitudinal extension along a direction line transverse to said hinge axes, outer hinge means pivotally connecting the outer end of said boom means to said free edge of said outer panel and having a hinge axis parallel to said first mentioned hinge axes, and slide pivot means connecting said panels and boom means.

2. A solar array according to claim 1, wherein:

said housing comprises the body of a spacecraft.

3. A solar array according to claim 1, wherein:

said hinge means extend along the longer sides of said panels.

4. A solar array comprising:

a housing;

a foldable solar panel assembly at one side of said housing including a number of generally planar and rectangular solar panels disposed edge-to-edge, and hinge means pivotally joining adjacent panels along the adjacent edges thereof;

said panel assembly having an inner end panel adjacent said housing and an outer end panel remote from said housing, and said end panels having free edges parallel to said adjacent panel edges;

inner hinge means pivotally joining said inner panel to said housing side along said free edge of said inner panel;

said hinge means having parallel hinge axes whereby said panel assembly may be folded to a retracted position of stowage wherein the assembly is positioned flat against said housing side with the adjacent panels disposed in face-to-face relation, and said panenl assembly may be unfolded to an extended position of operation wherein said assembly projects laterally from said housing side with said panels disposed in edge-to-edge relation substantially in a common plane;

deployment means mounted on said housing and connected to said panel assembly for deploying said assembly from said retracted position to said extended position including longitudinally extendable boom means mounted on said housing for longitudinal extension along a direction line transverse to said hinge axes, outer hinge means pivotally connecting the outer end of said boom means to said free edge of said outer panel and having a hinge axis parallel to said first mentioned hinge axes, and slide pivot means connecting said panels and boom means; and a hold-down secured to the outer end of said boom means for engaging said outer panel of said panel assembly when said boom means is retracted to retain said panel assembly in its folded position of stowage.

5. A solar array according to claim 4, wherein:

said panels each comprise a number of thin-film solar cells joined edge-to-edge.

6. A deployable solar array comprising:

a housing;

a foldable solar panel assembly at one side of said housing including a number of generally planar and rectangular solar panels disposed edge-to-edge, and hinge means pivotally joining the adjacent panels along the adjacent edges thereof;

said panel assembly having an inner end panel adjacent said housing an outer end panel remote from said housing, and said end panels having free edges parallel to said adjacent edges, respectively;

inner hinge means pivotally joining said inner panel to said housing side along said free edge of said inner panel;

said hinge means having parallel hinge axis whereby said panel assembly may be folded to a retracted position of stowage wherein the assembly is positioned flat against said housing side with the adjacent panels disposed in face-to-face relations, and said panel assembly may be unfolded to an extended position of operation wherein said assembly projects laterally from said housing side with said panels disposed in edge-to-edge relation substantially in a common plane; and deployment means including a pair of longitudinally extendable booms mounted on said housing in straddling relation to said panel assembly in the endwise direction of said hinge axes for longitudinal extension along parallel direction lines located in said common plane between retracted positions wherein the outer ends of said booms are located adjacent said housing side and extended positions wherein said booms project laterally from said housing in said common plane, a tie-bar extending between and secured to the outer ends of said booms, outer hinge means pivotally joining said tie-bar to said free edge of said outer panel, and slide pivot means connecting said panels and booms whereby said panel assembly is retained in its folded position of stowage when said booms are retracted and said panel assembly is unfolded to its extended position of operation by extension of said booms.

7. A solar array according to claim 6, including:
a hold-down extending laterally of and secured to said tie-bar for engaging said outer panel of said panel assembly to retain the latter in its folded position of stowage when said booms are retracted.

8. A solar array according to claim 6, wherein:
said panels each comprise a number of thin-film solar cells joined edge-to-edge.

9. A solar array according to claim 6, wherein:
said housing comprises the body of a spacecraft.

10. A spacecraft comprising:
a housing;
a pair of deployable solar cell arrays located at opposite sides of said housing each including a foldable solar panel assembly having a number of generally planar and rectangular solar panels disposed edge-to-edge, and hinge means pivotally joining the adjacent panels along the adjacent edges thereof
each said panel assembly having an inner end panel adjacent said housing and an outer end panel remote from said housing, and said end panels having free edges parallel to said adjacent panel edges;
inner hinge means pivotally joining each inner panel to the adjacent housing side along said free edge of the respective inner panel;
said hinge means having hinge axes parallel to the longitudinal axis of said housing, whereby said panel assemblies may be folded to retracted positions of stowage wherein the folded assemblies are positioned flat against the adjacent housing sides with the adjacent panels of each assembly disposed in face-to-face relation, and said panel assemblies may be unfolded to extended positions of operation wherein said assemblies project laterally from the adjacent housing sides with said panels of each assembly disposed in edge-to-edge relation substantially in a common plane parallel to said longitudinal housing axis and to the common plane of the other assembly; and
deployment means including longitudinally extendable boom means mounted on said housing and connected to said panel assemblies for deploying said assemblies from their retracted positions to their extended positions.

11. A spacecraft according to claim 10, wherein:
said boom means of each array comprise a pair of longitudinally extendable deployment booms, the two booms of each array straddling the corresponding solar panel assembly in the endwise direction of its respective hinge axes and being longitudinally extendable along parallel direction lines in said plane of the respective panel assembly between retracted positions wherein the outer ends of said booms are located adjacent said housing and extended positions, a tie-bar extending between and secured to the outer ends of said booms, outer hinge means pivotally joining said tie-bar to said free edge of the respective outer solar panel and having a hinge axis parallel to said first-mentioned hinge axes of the respective panel assembly, and slide pivot means connecting said booms and solar panels.

12. A spacecraft according to claim 10, including:
a main ion thrust engine mounted on the rear of said housing, and means electrically connecting said solar panels to said engine, whereby exposure of said panels to sunlight generates electrical power for operating said engine.

13. A spacecraft according to claim 10, including:
attitude control ion engines mounted on the outer ends of said arrays, and means electrically connecting said solar panels to said engines, whereby exposure of said panels to sunlight generates electrical power for operating said engines.

14. A spacecraft according to claim 10, wherein:

said panels each comprise a number of thin-film solar cells joined edge-to-edge.

15. A spacecraft according to claim 10, wherein:
said arrays are located at opposite sides of said housing; and
said planes of said panel assemblies are parallel and located at opposite sides of said housing.

16. A spacecraft according to claim 15, including:
attitude control engines mounted at the outer ends of said arrays, respectively, in such a way that said engines are located in a common plane containing said longitudinal housing axis when said arrays are extended.

17. A solar cell array comprising:
a foldable solar panel assembly including a number of generally planar and rectangular solar panels disposed edge-to-edge, and hinge means pivotally joining the adjacent panels along the adjacent edges thereof;
said hinge means having parallel hinge axes extending along said panel edges, respectively, whereby said panel assembly may be folded to a position of stowage wherein the adjacent panels are disposed in face-to-face relation, and said panel assembly may be unfolded to an extended position of operation wherein the panels are disposed in edge-to-edge relation substantially in a common plane;
said panel assembly has a normally inner end panel and a normally outer end panel, and said end panels have free edges parallel to said adjacent panel edges; and
said array further comprises deployment means including a pair of longitudinally extendable booms straddling said panel assembly in the endwise direction of said hinge axes, said booms having normally inner ends adjacent said inner panel and normally outer ends adjacent said outer panel, a tie-bar extending between and secured to said outer boom ends, hinge means pivotally joining said tie-bar to said free edge of said outer panel and having a hinge axis parallel to said first-mentioned hinge axes, and slide pivot means connecting said booms and solar panels.

18. A solar cell array according to claim 17, wherein:
said panels each comprise a number of thin-film solar cells joined edge-to-edge.

19. A deployable solar cell array comprising:
two or more solar panels;
means for flexibly connecting said panels to form a foldable assembly having a first end and a second end;
an extendible boom assembly having a fixed end and a free end;
means for pivotally attaching the first end of the solar panel assembly to the fixed end of the extendible boom; and
means for pivotally attaching the second end of the solar panel assembly to the free end of the extendible boom; so that
as the boom extends, the solar panel assembly unfolds.

References Cited

UNITED STATES PATENTS

| | | | |
|---|---|---|---|
| 3,094,439 | 6/1963 | Mann et al. | 136—89 |
| 3,204,889 | 9/1965 | Schwinghamer | 244—1 |
| 3,300,162 | 1/1967 | Maynard et al. | 244—1 |
| 3,326,497 | 6/1967 | Michelson | 244—1 |
| 3,459,391 | 8/1969 | Haynos. | |

MILTON BUCHLER, Primary Examiner
J. L. FORMAN, Assistant Examiner

U.S. Cl. X.R.

136—89

UNITED STATES PATENT OFFICE
CERTIFICATE OF CORRECTION

Patent No. 3,532,299 Dated October 6, 1970

Inventor(s) Clyde E. Williamson and Donald R. Baker

It is certified that error appears in the above-identified patent and that said Letters Patent are hereby corrected as shown below:

Colume 2, line 28, after "deployment" insert --means--;

Colume 4, line 16, the word "space craft" should be one word --spacecraft--;

Colume 5, line 3, delete "panels" and insert --panel--;

Colume 6, line 75, insert after "62a" the word --are--;

Colume 8, line 8, correct "panem" to read --panel--;

Colume 9, line 17, after "thereof" insert --;--.

SIGNED AND SEALED
JAN 5 1971

(SEAL)
Attest:

Edward M. Fletcher, Jr.
Attesting Officer

WILLIAM E. SCHUYLER, JR.
Commissioner of Patents